Nov. 25, 1924.
1,516,705
H. BREECE
EGG TESTER
Filed Jan. 24, 1924
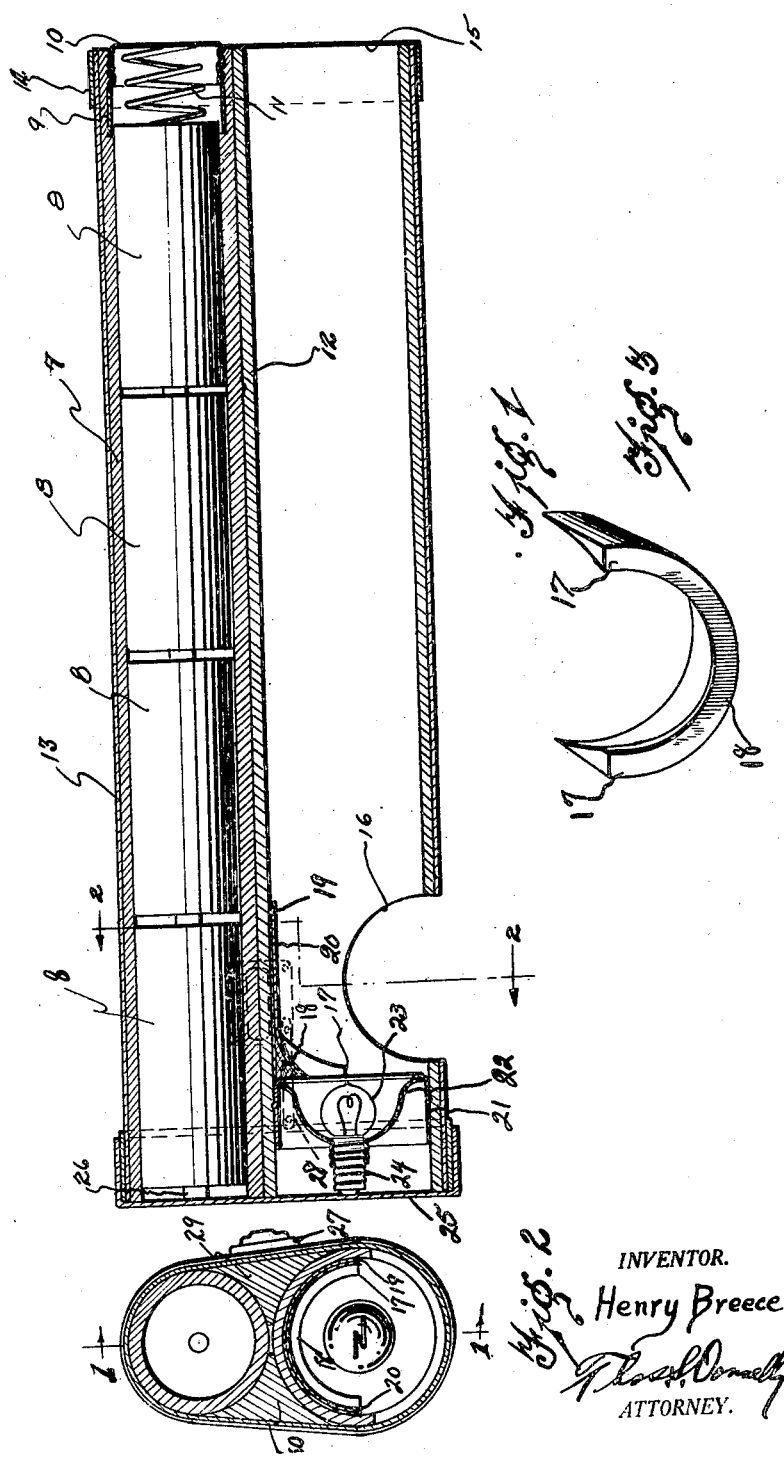
INVENTOR.
Henry Breece
ATTORNEY.

Patented Nov. 25, 1924.

1,516,705

UNITED STATES PATENT OFFICE.

HENRY BREECE, OF DETROIT, MICHIGAN.

EGG TESTER.

Application filed January 24, 1924. Serial No. 688,128.

*To all whom it may concern:*

Be it known that I, HENRY BREECE, a citizen of the United States, residing at Detroit, in the county of Wayne and State of Michigan, have invented a new and useful Improvement in an Egg Tester, of which the following is a specification.

My invention relates to a new and useful improvement in an egg tester and has for its object the provision of an egg tester which may be transported from place to place and which will have within itself, or a part of itself, the illuminating means used therewith.

Another object of the invention is the provision of an egg tester having an illuminating device and energizing means for said illuminating device adapted for transporting with said illuminating device.

Another object of the invention is the provision of an egg tester having an inspecting tube arranged for the accommodation of eggs of varying sizes and provided with means for directing the maximum amount of illumination toward the egg to be tested regardless of the size thereof.

Another object of the invention is the provision of an egg tester having illuminating means and a battery for energizing the same.

Other objects will appear hereinafter.

The invention consists in the combination and arrangement of parts hereinafter described and claimed and such variations thereof as come within the purview of the invention as herein set forth.

The invention will be best understood from a reference to the accompanying drawings which form a part of the specification and in which, Fig. 1 is a longitudinal sectional view of the invention, Fig. 2 is a sectional view taken on substantially line 2—2 of Fig. 1, and, Fig. 3 is a perspective view of the adjuster used in the invention.

The invention is adapted for testing eggs to ascertain their freshness or staleness as the case may be and in its preferred form comprises a tube 7 which may be made from any desired material, the preferable material being fibre or heavy card board. Positioned loosely in this tube 7 are sets of dry cells 8 which are adapted for engagement with the ends of each other, these batteries being ordinarily commercial batteries. Mounted in the rear end of the tube 8 is a metallic sleeve 9 which has threads provided on the outer end thereof to receive the threaded end of a cap 10 which is used to close the end of the tube and to afford an abutment for a coil spring 11 adapted to maintain the ends of the batteries in close engagement with each other.

Positioned along side of the tube 7 is a tube 12, made from the same material as the tube 7. This tube 12 is open at its rear end 15 and is provided adjacent its forward end with a notch 16, sufficiently large to allow the passage of an egg thereinto. Passed around the tubes is a band 13 which serves to bind the tubes in the assembled position. A reenforcing band 14 is mounted on the band 13 at the rear end of the tubes, which serves also to prevent a finished appearance to the device.

Mounted in the tube 12 forwardly of the opening 16 is an adjusting member having legs 17 and a main body portion 18 which is curved as shown and tapered toward the open end of the tube 12. The construction is such that eggs of various sizes may be tested by the device, the positioning of the larger eggs being toward the tapered portion of the adjuster and the positioning of smaller eggs being toward the larger portion of the adjuster. In this way the eggs of various sizes will fill up the space of the tube at that portion thus causing the light to be shut off by the egg. The egg while shutting off all of the light may then be turned as desired for properly testing the same. Positioned between this adjusting block and the wall of the tube 12 is a layer of felt 19 and covering the other side of the block is a layer of felt 20, the block itself being preferably made from wood, although this material is not essential.

Mounted in the tube 12, in any suitable manner is a metallic sleeve 21 in which is mounted a metallic reflector 22, having an opening formed centrally thereof and provided with a threaded neck at said opening to receive the stem 24 of a light bulb 23. The stem 24 is in engagement with the metallic cap 25 which is mounted over the ends of the tubes 7 and 12. This metallic cap also engages the pole 26 of the end battery section. In this way there is formed a means of conducting electricity from the pole 26 of the battery to the stem of the light bulb. The opposite pole of the end battery is connected by suitable wiring to a switch 27, the connection of the switch with the battery being made in a well known manner and therefore not described herein. The structure of the switch is well known, as being used with flashlights and the like and for this reason is not described herein. The switch 27 is connected by the arm 28 to the reflector, so that an electrical connection is thus made with the light bulb. Upon the closing of the switch the circuit through the light bulb is closed and the tube 12 is illuminated.

The space between the tubes, at the sides thereof, is filled with blocks of wood 29 and 30 which are shaped to fill in the space completely. If desired one of these blocks of wood may be provided with a bore running therethrough through which the wire connecting the reflector to the battery may be passed. If desired this wire may be passed between the block of wood and the tube 12.

In the use of egg testers it is frequently necessary to test eggs at places where electric lights are not available, as when the eggs are tested on the premises of the farmer from whom they are proposed to be purchased. The present invention is particularly well adapted for testing eggs under these conditions.

The arrangement of the block for accommodating eggs of various sizes also permits the proper testing of the eggs under favorable conditions, as the egg may be turned at will and as many different positions as desired presented to the light, without in any way lessening the efficiency of the tester, as all of the light is caused to be directed on the egg.

It is believed that a rigid structure is presented to the device as a whole, while at the same time the device is simple and compact.

Having thus described my invention what I claim as new and desire to secure by Letters Patent is:

1. In an egg tester, an inspecting tube having an egg receiving opening formed therein; and an adjusting block mounted in said tube and adapted for engaging eggs of varying sizes positioned in said tube to effectively close the passage way thereof.

2. An egg tester comprising a cylindrical inspecting tube having an egg receiving opening formed therein intermediate the ends thereof, adjacent one end thereof; an adjustment block mounted in said tube opposite said opening and adapted for engaging the sides of an egg inserted into said opening; illuminating means mounted in said tube intermediate said opening and the adjacent end of said tube; a cylindrical carrying tube; energizing means positioned in said carrying tube for energizing said illuminating means; bands extended around said tubes for retaining the same in co-operative relative position; and means for connecting said energizing means and said illuminating means.

3. An egg tester comprising an inspecting tube having an egg receiving opening formed therein intermediate its ends adjacent one end thereof; illuminating means mounted in said tube intermediate said opening and said adjacent end; an adjustment block mounted in said tube adjacent said opening adapted for engaging the outer surface of eggs placed in said opening irrespective of the size of said eggs, so as to effectively close with the egg the passageway in said tube for effecting a direction of the rays of light from said illuminating means through the egg placed in said opening toward the opposite end of said tube.

4. An egg tester comprising a cylindrical inspecting tube having an egg receiving opening formed therein intermediate its ends, adjacent one end thereof; illuminating means mounted in said tube intermediate said opening and said adjacent end, said illuminating means being adapted for directing the rays of light toward the opposite end of said tube; an adjusting block mounted in said tube opposite said opening and adapted for engaging the surfaces of eggs placed in said opening for effectively closing with the egg the passageway in said tube for directing the rays of light from said illuminating means through said egg toward said opposite end, the sides of said adjusting block being tapered toward said opposite end and downwardly toward said egg receiving opening.

5. An egg tester comprising a cylindrical inspecting tube having an egg receiving opening formed therein at one side thereof intermediate its ends, adjacent one end thereof; illuminating means mounted in said tube intermediate said opening and said adjacent end; a separate cylindrical tube of smaller diameter than said inspecting tube; energizing means mounted in said separate tube for energizing said illuminating means; and means for connecting said energizing means and said illuminating means.

6. An egg tester comprising an inspection tube having an egg receiving opening formed in one side intermediate its ends illuminating means mounted in said tube; a separate carrying tube; energizing means mounted in said carrying tube for energizing said illuminating means; means for connecting said illuminating means and said energizing means; and binding members embracing said tubes and adapted for retaining the same in co-operative relative position.

7. An egg tester comprising a cylindrical inspection tube having an egg receiving opening formed therein; illuminating means adapted to project rays of light past said opening; a cylindrical carrying tube; energizing means mounted in said carrying tube; bands passed around said tubes for retaining the same in assembled position, each of said tubes being open at one end; a cap adapted for mounting on said tubes for closing the end of each of said tubes, said cap forming a metallic connection between said energizing means and said illuminating means.

8. An egg tester comprising an inspection tube, having an egg receiving opening formed therein; illuminating means mounted in said tube adjacent one end thereof and adapted for projecting rays of light past said opening toward the opposite end of said tube, the opposite end of said tube being open; a carrying tube; energizing means mounted in said carrying tube for energizing said illuminating means; a plurality of bands embracing said tubes for retaining the same in co-operative relative position, each of said tubes being open at adjacent ends; and means for closing each of said tubes, said means serving to provide an electrical conducting connection between said energizing means and said illuminating means.

9. An egg tester comprising a cylindrical inspection tube having an egg receiving opening formed therein adjacent one end thereof, the opposite end being open; illuminating means mounted in said tube intermediate said egg receiving opening and the adjacent end; a carrying tube; means mounted in said carrying tube for energizing said illuminating means; a covering for said tubes extending throughout the length thereof adapted to retain said tubes in co-operative relative position; a plurality of bands mounted on said covering and embracing said tubes; a cap mounted on said tubes adjacent one end thereof and adapted for electrically connecting said energizing means and said illuminating means; and a filler positioned within said covering and adapted to project into the space formed between said covering and the diverging peripheries of said tubes.

In testimony whereof I have signed the foregoing.

HENRY BREECE.